United States Patent [19]
Pinfield

[11] 3,832,914
[45] Sept. 3, 1974

[54] GEARBOX

[75] Inventor: Maurice John Pinfield, Carlingford, N.S.W., Australia

[73] Assignee: Placer Exploration Limited, Smithfield, New South Wales, Australia

[22] Filed: Dec. 11, 1972

[21] Appl. No.: 313,925

[30] Foreign Application Priority Data
Dec. 17, 1971 Australia.............................. 7422/71
Dec. 6, 1972 Australia........................... 49718/72

[52] U.S. Cl................................ 74/812, 192/48.92
[51] Int. Cl.......................... F16h 5/00, F16d 41/00
[58] Field of Search...................... 74/812; 192/48.92

[56] References Cited
UNITED STATES PATENTS
272,325   2/1883   Reuleaux............................ 74/812

3,666,063   5/1972   Schoeman et al. ................ 74/812 X

FOREIGN PATENTS OR APPLICATIONS
520,751   1/1956   Canada........................... 192/48.92
932,397   9/1955   Germany.............................. 74/812

Primary Examiner—Samuel Scott
Assistant Examiner—P. S. Lall
Attorney, Agent, or Firm—Christie, Parker & Hale

[57] ABSTRACT

A gearbox having a gear train connecting an input shaft to an output shaft, two unidirectional driving clutches in the gear train whereby by reversing the rotation of the input shaft the output shaft will turn at different speeds but in the same direction.

4 Claims, 10 Drawing Figures

GEARBOX

FIELD OF THE INVENTION

This invention provides a gearbox offering several different speeds for its output shaft and which, by virtue of its construction, can be remotely controlled to select any one of the available speeds.

BACKGROUND OF THE INVENTION

The gearbox has wide application but has been principally developed for use on a drill rig. When so used it is located adjacent the upper end of the drill rig mast and in driving connection with the drill rod. In order to change speeds in a gearbox as used hitherto for this purpose a workman had to climb the mast to operate speed change mechanism but with this invention any speed change required can be effected from a control panel located at ground level.

SUMMARY OF THE INVENTION

Accordingly the invention provides a gearbox comprising a housing, an input shaft and an output shaft, a gear train connecting the input shaft through two unidirectionally driving clutches to the output shaft whereby the output shaft may be driven at one or the other of two speeds but in the same direction as determined by the direction of rotation of the input shaft.

DESCRIPTION OF THE DRAWINGS

The invention in two forms will be described with reference to the drawings in which.

DETAILED DESCRIPTION

It is to be understood that the components hereinafter described are housed in a housing adapted to be lubricated and mounted in operative position.

Figure 1:
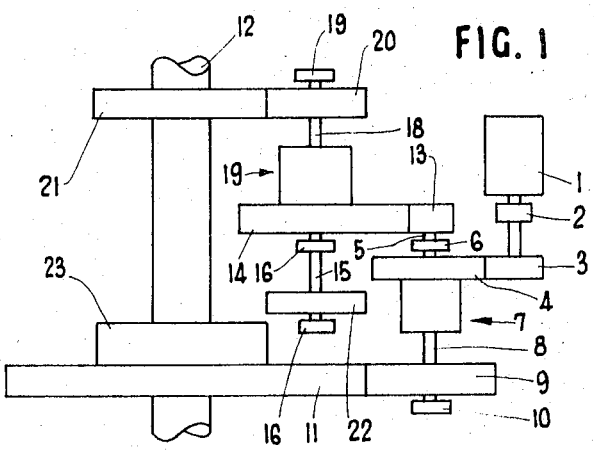
FIG. 1 is a schematic arrangement of the gearbox components of the first form.

Referring to FIG. 1, there is provided a hydraulic motor 1 having a single output shaft 2 to which is fixed a gear 3. The gear 3 meshes with a gear 4 fixed to a first lay shaft 5 supported in bearings schematically shown and indicated 6. The gear 4 is fixed to the outer of an unidirectionally driving clutch 7 comprising an outer part and an inner part which are drivingly coupled so as to rotate in the same direction when the outer is rotated in one direction and are uncoupled when the outer rotates in the reverse direction. Such clutches are known in industry as "SPRAG" clutches. The clutch inner is fixed to an output shaft 8 to which is fixed a gear 9, the shaft 8 being supported in a bearing indicated 10. The gear 9 meshes with a gear 11 fixed to the gearbox output shaft 12.

It follows that if the motor 1 rotates say clockwise the gear 3 rotates clockwise, the gear 4 and the outer part of the clutch rotates anti-clockwise and depending upon the drive direction of clutch chosen the shaft 8 will or will not be driven. Assuming a clutch that drives the inner part and the output shaft 8 for anti-clockwise rotation of the clutch outer part, then the gear 9 rotates anti-clockwise and the gear 11 and shaft 12 rotate clockwise. The result is that for a clockwise rotation of the gear 3 the shaft 12 rotates clockwise. The hydraulic motor 1 is reversible and it follows that for an anti-clockwise rotation of gear 3 there is no rotation of the shaft 12 due to the clutch 7 being in a non driving configuration with the clutch outer rotating clockwise and being uncoupled from the clutch inner.

The shaft 12 is also drivable through another gear-clutch train comprising a gear 13 also fixed to the shaft 5 and meshing with a gear 14 fixed to a second lay shaft 15 supported in bearings indicated 16. The gear 14 is fixed to the outer of another unidirectional drive clutch 17 the inner of which is fixed to shaft 18 supported in a bearing indicated 19. A gear 20 is fixed to the shaft 18 and meshes with a gear 21 fixed to the shaft 12.

Assuming the clutch 7 and 17 are the same type i.e., an outer part anti-clockwise rotation results in the clutch inner being driven. Then, for a clockwise rotation of gear 3 the outer part of clutch 7 is driven anti-clockwise and the shaft 12 is rotated through gears 9–11. The clockwise rotation of gear 3 provided anti-clockwise rotation of gear 13 and a clockwise rotation of gear 14 and the outer part of clutch 17. It follows from the clutch construction described above that there is no resultant drive to the inner part of clutch 17 or shaft 18.

The reverse rotation of gear 3 will reverse the situation i.e., the shaft 8 will not be driven and the shaft 18 will be driven to transfer the drive to shaft 12 through gears 20–21. It is to be noted however that the direction of shaft 12 is still clockwise. By selection of the sizes of gears 13–14 and 20–21 as against 9–11 two fixed but different speeds of the shaft 12 are obtainable. Thus, simply by reversing the direction of the motor 1 the shaft 12 can be driven at one or the other of two different speeds but in the same direction.

In order to reverse the direction of shaft 12 a change direction pair of gears is provided. These gears are identified 22 and 23 and are respectively fixed to shafts 15 and 12. To enable the change direction gear train to be safely engaged the gear 23 is fixed to the gear 11 and both are slidingly but drivingly coupled to shaft 12 as for example by keys and keyways or mating splines. To reverse the direction of rotation of shaft 12 the gears 23 and 22 are engaged by sliding the gears 23–11 along the shaft 12. This automatically disengages gears 11 and 9.

With a clockwise rotation of gear 3 a drive is transmitted to shaft 8, but gears 9 and 11 are not meshed. Therefore there is no direct drive to shaft 12 along this path. However a direct drive is transmitted to shaft 15 which will rotate clockwise and through gears 22–23, an anti-clockwise rotation is imparted to shaft 12. It is to be noted that as shaft 15 rotates clockwise no drive is transferred to shaft 18 through clutch 17.

If an anti-clockwise rotation had been selected for gear 3, the result is an anti-clockwise rotation of shaft 15 and a drive through shaft 18 and gear 20 and 21 to shaft 12 to turn it clockwise, not anti-clockwise as is required. This will occur even though reverse direction change gears 22–23 are engaged, because shaft 15 is also driving to shaft 12 through gears 22 and 23 to provide clockwise rotation of shaft 12. The gear ratios 22–23 and 20–21 are made the same to ensure that where the reverse direction drive ability is incorporated into a gearbox no harm can be done to the gearbox by inadvertent selection of the wrong direction for motor 1. Damage would occur if the ratios differed as one gear pair would be trying to drive the shaft 12 at a different speed to the other gear pair.

The previously described gearbox provides a "forward" direct drive at either of two possible different speeds and a "reverse" drive at a speed corresponding with one of the "forward" speeds.

Figure 2:
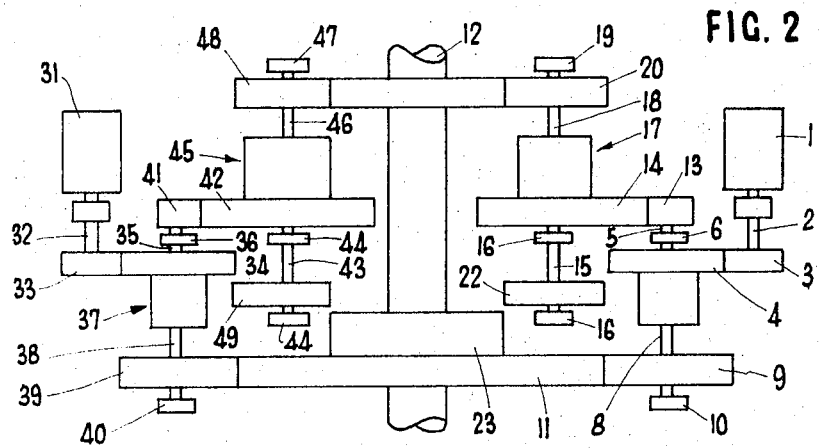
FIG. 2 is a schematic arrangement of the gearbox components of the second form.

A gearbox having two sections each similarly equipped to that described and both driving the shaft 12 is illustrated in FIG. 2, with the FIG. 2 gearbox it is possible to obtain six "forward" speeds and a "reverse" speed.

The various items of the second gearbox section have been numbered and description thereof is unnecessary, the numbers commence at 31 and continue to 49. It is to be noted that gears 20, 22, 48 and 49 all have the same number of teeth for the safety reason explained above when "reverse" is selected. To illustrate the speed possibilities and the "reverse" drive FIGS. 3 to 9 are provided. In each the driving parts are shown in full and the non driving parts are shown in broken outline.

The following speed and torque ranges can be achieved for the gearbox, as applied to the drill rod of a drill rig, having for example, a depth capacity of at least 4,000 ft and using a variable displacement pump supply the fluid motors. Intermediate speeds are achieved by varying the output of the pump up to that which give the maximum R.P.M. listed:

| Drill Head | Spindle Speed | Spindle Torque |
|---|---|---|
| 1st Range | 0 to 73 R.P.M. | 10,200 lb. ft. |
| 2nd Range | 0 to 120 R.P.M. | 6,265 lb. ft. |
| 3rd Range | 0 to 190 R.P.M. | 3,976 lb. ft. |
| 4th Range | 0 to 525 R.P.M. | 1,435 lb. ft. |
| 5th Range | 0 to 900 R.P.M. | 835 lb. ft. |
| 6th Range | 0 to 12500 R.P.M. | 600 lb. ft. |
| Reverse | 0 to 73 R.P.M. | 10,200 lb. ft. |

Figure 3:
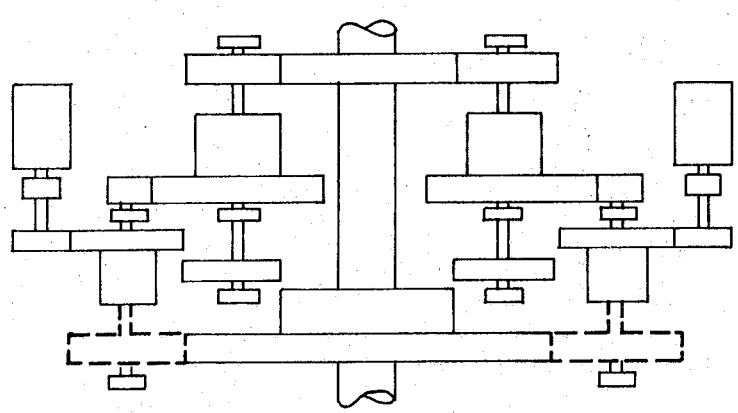
FIG. 3 shows all the components of the gearbox of FIG. 2, the active components to achieve first speed of the gearbox output shaft being shown in full lines.
Figure 4:
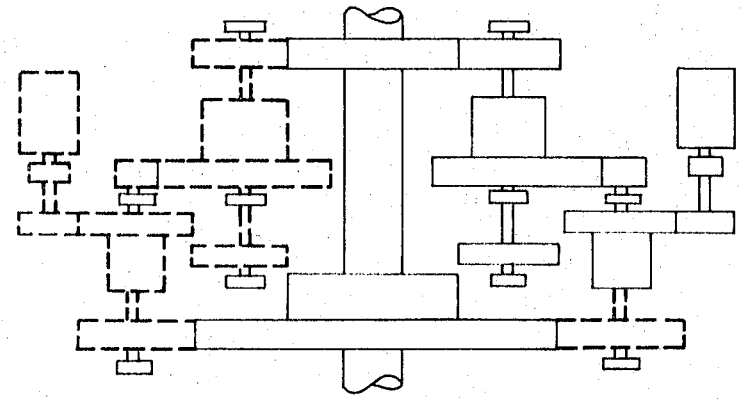
FIG. 4 is a view similar to FIG. 3 for the next fastest speed.
Figure 5:
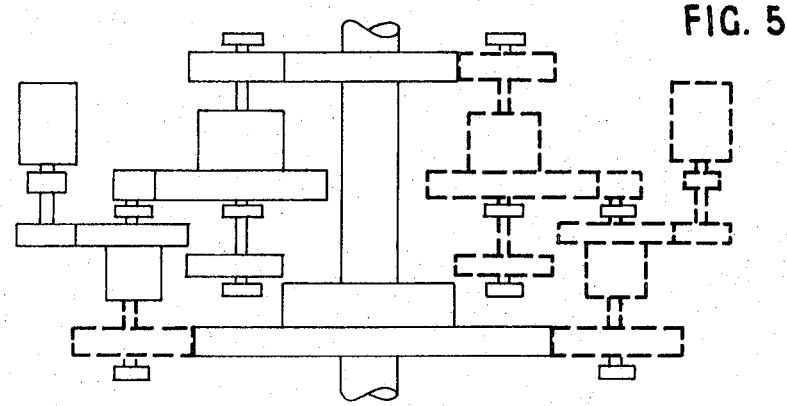
FIG. 5 is a view similar to FIG. 3 for the next fastest speed.
Figure 6:
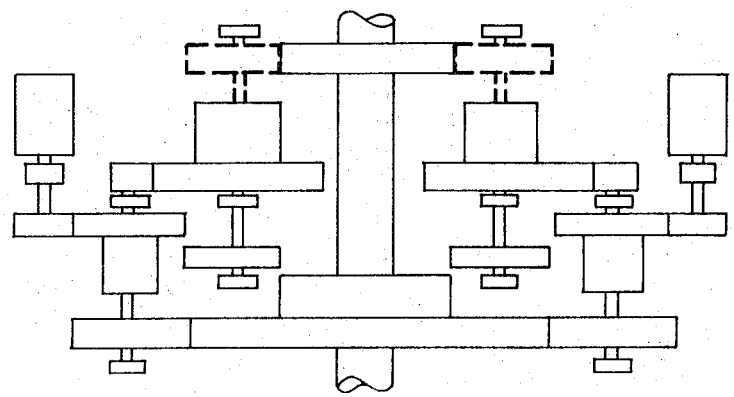
FIG. 6 is a view similar to FIG. 3 for the next fastest speed.
Figure 7:
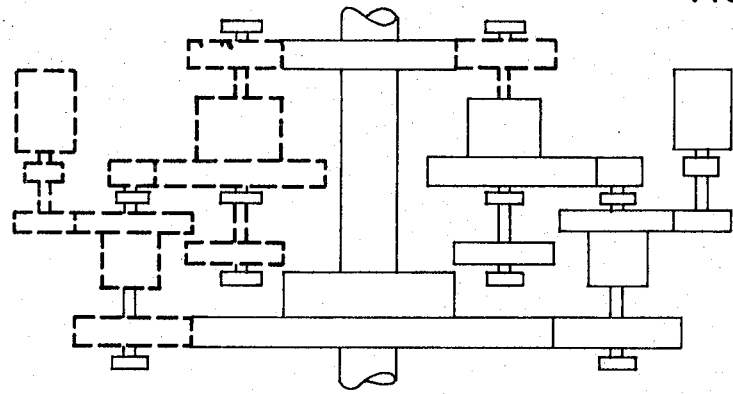
FIG. 7 is a view similar to FIG. 3 for the next fastest speed.
Figure 8:
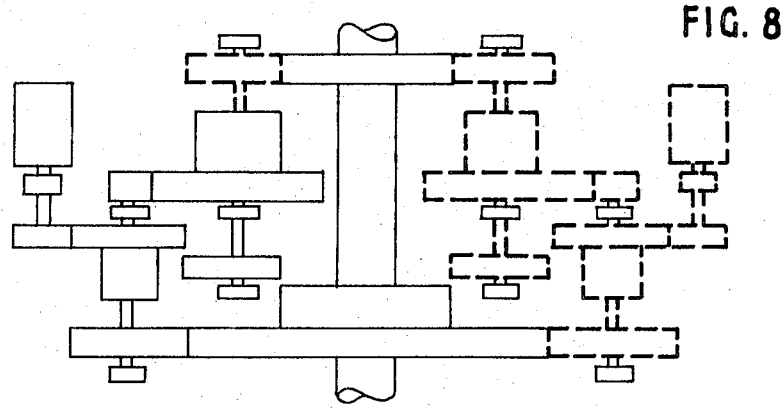
FIG. 8 is a view similar to FIG. 3 for the fastest speed.
Figure 9:
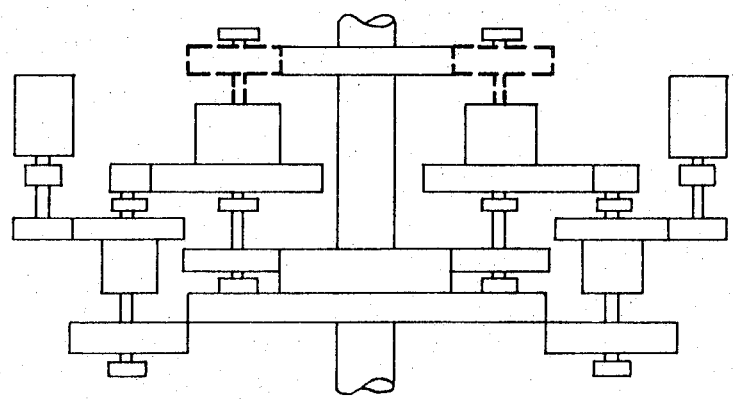
FIG. 9 shows the operative components of the gearbox of FIG. 2 for reverse rotational direction of the gearbox output shaft.

FIG. 3 shows first speed, the motor 1 and 31 are both driven anti-clockwise;

FIG. 4 shows second speed with motor 1 driven anti-clockwise;

FIG. 5 shows third speed with motor 31 driven anti-clockwise;

FIG. 6 shows fourth speed with both motors 1 and 31 energised with clockwise rotation;

FIG. 7 shows fifth speed with motor 1 driven in a clockwise direction;

FIG. 8 shows sixth speed with motor 31 driven in a clockwise direction;

FIG. 9 shows reverse speed with both motors driven clockwise and gear 23 meshing with gears 22 and 49 and hence disengaged from gears 9 and 39.

Figure 10:
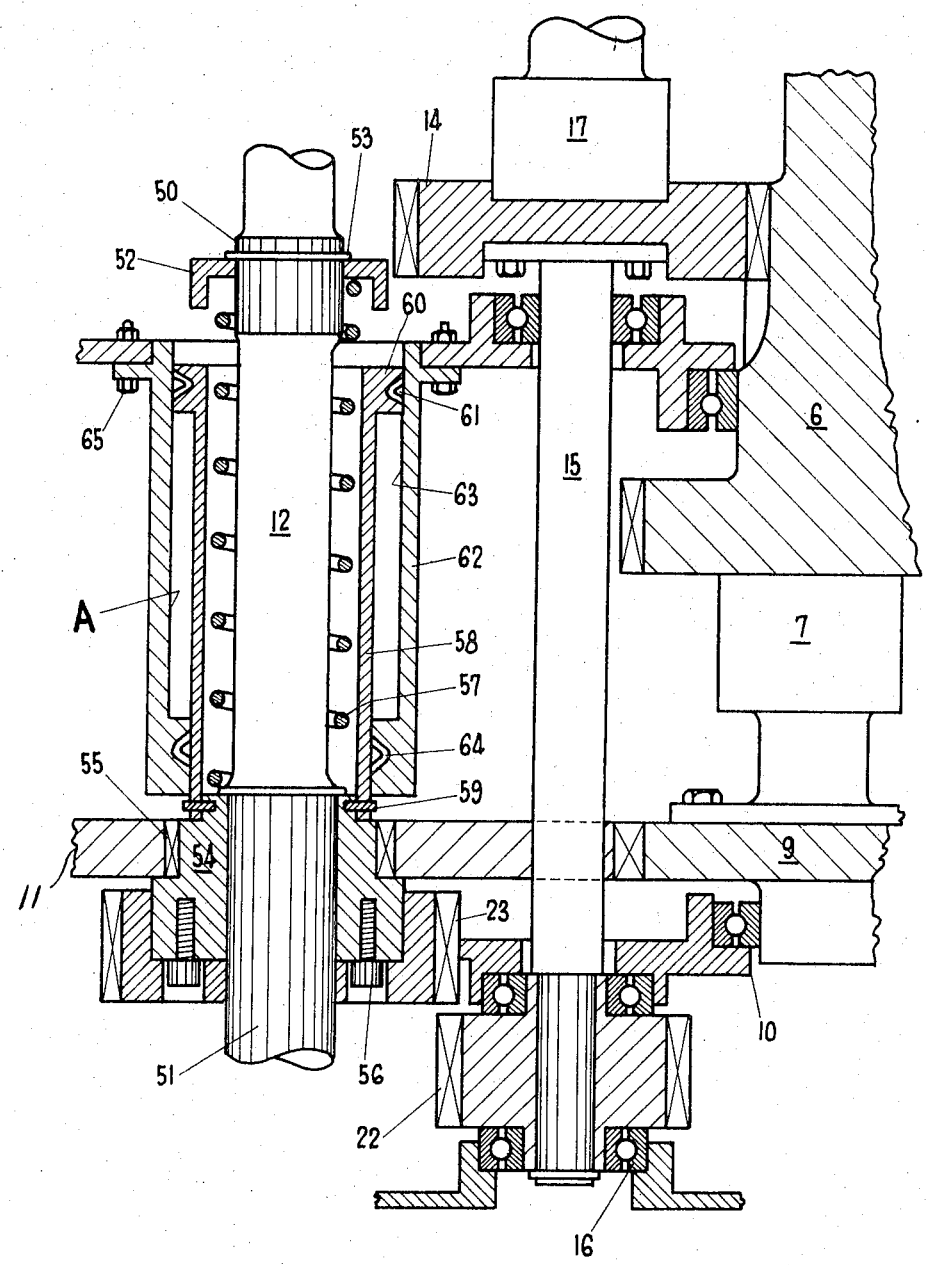

The foregoing theoretically describes the invention in two forms in practice the gears 11–23 are moved on the shaft 12 remotely by means of oil pressure and FIG. 10 illustrates one method whereby this can be done.

FIG. 10 is portion of an assembly drawing for the full gear box of FIG. 1 and as will be appreciated from the section shown the full assembly drawing is extremely detailed and involves many components. As the principles of the gearbox can be readily understood from the schematic drawings used above and as the details of the types of bearings, shape of gears and types of oil seals etc., do not in any way form part of the invention, no attempt has been made to provide a full view of the gearbox internal components.

From FIG. 10 it will be seen that the position of the gear drives 22–23 and 9–11 have been reversed in that the gear drive 9–11 is disposed above the gear drive 22–23 on the shaft 12. Shaft 12 is reduced in diameter between two splined portions 50 and 51. On the portion 50 there is a shroud 52 restrained against movement in one direction by a circlip 53. On the portion 51 there is hub 54 to which gear 11 is connected by splines 55 and to which gear 23 is fastened by bolts 56.

As illustrated the gear 11 is meshing with the gear 9 and the gear 23 is out of mesh with gear 22. The gears are retained in this position against the action of spring 57 by a hydraulic piston-cylinder arrangement. The piston comprises a sleeve 58 fixed to the hub 54 by screws 59 and having at its upper end a ring enlargement 60 incorporating a circumferential seal 61. The cylinder comprises a sleeve 62 encircling the piston with the bore 63 of the sleeve 62 bearing against seal 61. The sleeve 62 at its lower end has a seal 64 which bears against the outside of sleeve 58, thus there is formed between the seals 61 and 64 an oil tight area "A." The sleeve 62 is secured as at 65 to an internal frame member 66 of the gearbox housing.

From the foregoing it is clear that with no pressurised oil in the area "A" the spring 57 promotes engagement of gears 22 and 23 and that so long as there is pressurised oil in the area "A" the gears 9 and 11 are maintained in engagement.

The control system for the motors and the supply of pressurised oil to area "A" is conventional and does not form part of this invention. Known valves can be readily assembled on a control panel remote from the gearbox and adapted to supply pressurized oil to the gearbox through hydraulic oil lines.

I claim:

1. A gearbox comprising a housing, a reversible motor mounted on the housing and having a drive shaft alternatively rotatable in opposite directions, an output shaft, and selectable speed drive means coupling the motor to the output shaft, the drive means including a first gear train connecting the motor shaft to two unidirectionally driving clutches each having an output shaft, said output shafts being alternatively rotatable depending upon the direction of rotation of the drive motor shaft, and second and third gear trains respectively connecting each clutch output shaft to the output shaft to drive the gearbox output shaft in the same direction at one or other of two speeds determined by the ratio of the gears in the gear trains and the direction of rotation of the motor shaft, each clutch comprising a driving part and a driven part which are drivingly coupled for a first direction of rotation of the driving part and are not so coupled for the opposite direction of rotation of the driving part, and the first gear train comprising a first pinion gear on the motor drive shaft, a first gear wheel on a first lay shaft and meshing with the first pinion, the driving part of one clutch being fixed to the first gear wheel, a second pinion fixed to the first gear wheel, a second gear wheel fixed to a second lay shaft and driven by the second pinion, the driving part of the other clutch being fixed to the second gear wheel, said second and third gear trains comprising third and fourth pinion gears fixed respectively to the driven parts of the clutches and third and fourth gear wheels fixed to the gearbox output shaft and meshing respectively with the third and fourth pinions.

2. A gearbox as claimed in claim 1 wherein each clutch comprises a driving part and a driven part which are drivingly coupled for a first direction of rotation of the driving part and are not so coupled for the opposite direction of rotation of the driving part and the first gear train comprises a first pinion gear on the motor drive shaft, a first gear wheel on a first lay shaft and meshing with the first pinion, the driving part of one clutch being fixed to the first gear wheel, a second pinion fixed to the first gear wheel, a second gear wheel fixed to a second lay shaft and driven by the second pinion, the driving part of the other clutch being fixed to the second gear wheel, said second and third gear trains comprising third and fourth pinion gears fixed respectively to the driven parts of the clutches and third and fourth gear wheels fixed to the gearbox output shaft and meshing respectively with the third and fourth pinions.

3. A gearbox as claimed in claim 1 including gearbox output shaft direction reversing means comprising a fifth gear wheel mounted on the gearbox output shaft movable into engagement with a fifth pinion gear fixed to the second lay shaft upon disengagement of the third pinion of the clutch association with the first lay shaft with its associated fourth gear wheel.

4. A gearbox as claimed in claim 1 further including a second reversible motor and a second selectable drive means coupling the second motor to said output shaft, the second drive means being substantially identical to the first drive means, two input shafts and two gear trains each having two unidirectionally driving clutches connecting the input shafts to the output shaft, whereby the output shaft can be driven with anyone of six speeds depending upon whether either or both input shafts are rotated and the direction in which the input shafts are rotated.

* * * * *